E. & C. S. GOWLLAND.
OPHTHALMOMETER AND CERTAIN OTHER SIGHT TESTING INSTRUMENTS.
APPLICATION FILED JAN. 31, 1908.
980,896.
Patented Jan. 3, 1911.
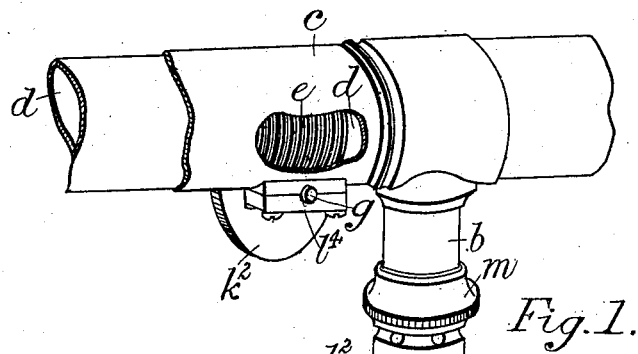
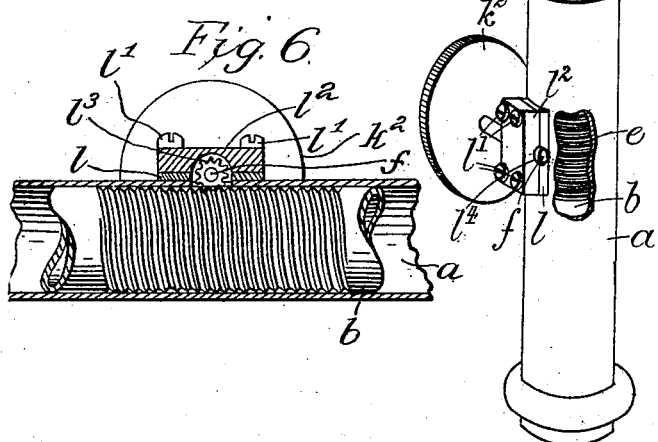
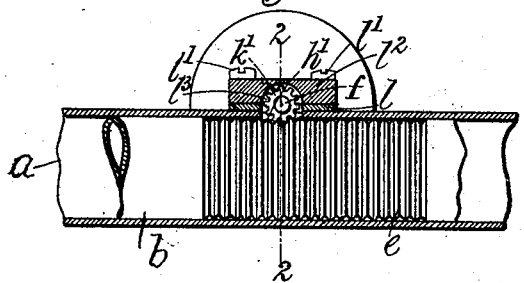
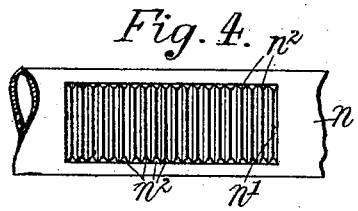
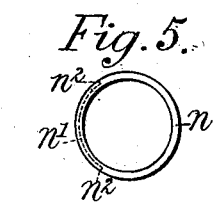
Witnesses:
Harry T. P. Gee.
V. W. Ward.
Inventors:
E. Gowlland,
C. S. Gowlland.
By Wm E Richards
Their Attorney.

UNITED STATES PATENT OFFICE.

EGBERT GOWLLAND AND CHARLES SEPTIMUS GOWLLAND, OF CROYDON, ENGLAND.

OPHTHALMOMETER AND CERTAIN OTHER SIGHT-TESTING INSTRUMENTS.

980,896. Specification of Letters Patent. Patented Jan. 3, 1911.

Application filed January 31, 1908. Serial No. 413,637.

*To all whom it may concern:*

Be it known that we, EGBERT GOWLLAND and CHARLES SEPTIMUS GOWLLAND, subjects of Edward VII, King of Great Britain and Ireland, and residing at Morland Road, Croydon, in the county of Surrey, England, have invented certain new and useful Improvements in or Relating to Ophthalmometers and Certain other Sight-Testing Instruments, of which the following is a specification.

Our present invention relates to ophthalmometers (known also as "keratometers") and other sight-testing instruments of the class which are required to be adjusted both in the vertical direction or in the horizontal direction (or in any direction between these two extremes) and in a rotary direction as well. In instruments of this class, as heretofore constructed, the means for effecting these adjustments frequently consist of a separate rack and pinion combination for each adjustment.

Now the object of our present invention is to enable both of these adjustments to be effected either simultaneously or separately by one rack and pinion combination, and, according to this invention, we make the teeth of the rack curved in the direction of their length, and we gear therewith a suitable pinion. The rack may, in accordance with this invention, and if desired, be curved in any other direction as well, that is, it may be provided on a curved surface other than cylindrical.

In applying the invention to an ophthalmometer, we form upon the surface—preferably the exterior surface—of the vertically sliding post and also upon the telescope-tube a rack, the teeth of which are curved and are formed by a series of parallel and circumferential grooves or, if desired, instead of providing said series of grooves, the post and the telescope tube may each be provided with one continuous groove of spiral form constituting the rack. We provide also two pinions which we mount in suitable bearings, and gear one of these pinions with the grooves or groove formed upon the sliding post, and the other pinion we gear with the grooves or groove formed upon the telescope tube. We furnish the pinions with milled heads or other suitable means by which they may be turned.

By way of example, the invention is shown in the accompanying drawings applied to an ophthalmometer, Figure 1 being a perspective view of a portion of an ophthalmometer having our invention applied thereto; Fig. 2 a sectional elevation of a portion of Fig. 1; Fig. 3 a section substantially on line 2—2 of Fig. 2; Fig. 4 a portion of a tube having formed thereon a modified form of rack in accordance with this invention, and Fig. 5 an end elevation of Fig. 4. Fig. 6 is a sectional view of a modification.

Referring to Fig. 1 of the drawings, $a$ is the external tube in which works the sliding-post $b$ carrying at its upper end the external tube $c$, wherein is adapted to work the telescope tube $d$, all these parts being as heretofore. Upon the exterior surface of the post $b$ and telescope tube $d$ we furnish a rack, the teeth of which are formed by a series of parallel circumferential grooves $e$ which are of a suitable depth, and are distinct from one another. These grooves are arranged in planes at right angles to the axis of said post and telescope tube respectively. We provide also two pinions, gearing with the racks, and arranged on spindles $f$ and $g$ respectively.

As the combination of rack and pinion, and the means for retaining these two parts in engagement with one another, is the same for the sliding-post as for the telescope tube, we have shown one such combination, and the parts immediately adjacent thereto, more clearly in Figs. 2 and 3, to which reference will now be made. In these figures, only those parts of Fig. 1 which are material for this specification are repeated, the reference letters $a$, $b$, and $f$ representing the same parts as before. The spindle $f$ carries the pinion $k'$, (shown broken away in Fig. 3) which is preferably curved from end to end, as shown, so as to fit the curvature of the rack or grooves $e$, the external tube $a$ having a hole $h'$ formed therein through which the pinion projects so as to mesh with the rack. Referring also to Fig. 1, $l$ is a saddle piece fixed to the external tube $h$, and fitted, by means of screws $l'$, to said saddle-piece, is a cover $l^2$, which is recessed at $l^3$ to receive the pinion; the pinion being thus concealed. At opposite sides of the saddle-piece $l$ and cover $l^2$ respectively are formed half-bearings or semi-circular depressions which, when placed over one another, form complete bearings at $l^4$ $l^4$ (Fig. 1) in which the spindles carrying the pinions work. A milled-wheel $k^2$ is fixed upon the spindles for operating the same. Thus, a combined endwise and rotary movement may be obtained by turning the milled-wheel $h^2$ with one hand, and simultaneously turning either the post $b$ or the telescope tube $d$, as the case may be, with the other hand. $m$ (Fig. 1) is the usual milled-nut for fixing the post in position.

We do not confine ourselves to the use of complete circumferential grooves, but may, if desired, form them for only a portion of the way around the circumference, as shown in Figs. 4 and 5, wherein $n$ represents a portion of a tube on which a rack is formed consisting of a series of parallel grooves $n'$, with which a suitable pinion is intended to gear. The tube $n$ is intended to work inside another tube, or other suitable bearing, whereby the pinion is held in gear with the rack $n'$. The ends of the grooves $n'$ form stops or abutments $n^2$, which are adapted to abut against the ends of the pinion when the tube $n$ is turned axially, and thereby limit the rotary movement of the latter. The grooves may be of any suitable pitch, and at any suitable degree of obliquity to the axis (see Fig. 6).

When the rack is to be only a partially circumferential one and formed on a hollow tube, the teeth thereof may be formed by cutting or otherwise forming slots in the tube, as will be readily understood from the foregoing description. The rack may be formed on a member of any suitable section, and which permits of the required movements.

We claim:

1. In an ophthalmometer, an external upright stationary tube, a sliding tube fitting in said stationary tube and having a curved gear surface thereon, an external tube $c$ carried by the sliding tube, a telescoping tube in said tube $c$ and having a curved gear surface thereon, and means for imparting longitudinal movement to the sliding tube and telescoping tube respectively, each of said means comprising a stationary pinion having teeth conforming to and engaging the gear surface on the movable tube.

2. In an ophthalmometer, an external upright stationary tube, a sliding tube fitting in said stationary tube and having a curved gear surface in the form of corrugations thereon, an external tube $c$ carried by the sliding tube, a telescoping tube in said tube $c$ and having a curved gear surface in the form of corrugations thereon, and means for imparting longitudinal movement to the sliding tube and telescoping tube respectively, each of said means comprising a stationary pinion having teeth conforming to and engaging the gear surface on the movable tube.

3. In an ophthalmometer, an external upright stationary tube, a sliding tube fitting in said stationary tube and having a curved gear surface in the form of a spiral thereon, an external tube $c$ carried by the sliding tube, a telescoping tube in said tube $c$ and having a curved gear surface in the form of a spiral thereon, and means for imparting longitudinal movement to the sliding tube and telescoping tube respectively, each of said means comprising a stationary pinion having teeth conforming to and engaging the gear surface on the movable tube.

4. In an ophthalmometer, an outer tube having a slot therein, an inner tube having a curved gear surface thereon, and a pinion supported on the outer tube and extending through the slot therein, said pinion having teeth conforming to and engaging the gear surface on the inner tube.

In testimony whereof we have hereunto set our hands in presence of two witnesses.

EGBERT GOWLLAND.
CHARLES SEPTIMUS GOWLLAND.

Witnesses:
HENRY KEMP SEMPKIN,
HARRY THOMAS PAGE LEE.